(12) United States Patent
Umemoto

(10) Patent No.: US 10,703,409 B2
(45) Date of Patent: Jul. 7, 2020

(54) WORK VEHICLE AXLE DEVICE

(71) Applicant: KUBOTA CORPORATION, Osaka (JP)

(72) Inventor: Tomeo Umemoto, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 156 days.

(21) Appl. No.: 15/619,954

(22) Filed: Jun. 12, 2017

(65) Prior Publication Data

US 2017/0369097 A1 Dec. 28, 2017

(30) Foreign Application Priority Data

Jun. 27, 2016 (JP) .................. 2016-126518

(51) Int. Cl.
*B62D 7/08* (2006.01)
*B62D 7/16* (2006.01)
(Continued)

(52) U.S. Cl.
CPC .............. *B62D 7/08* (2013.01); *A01B 69/007* (2013.01); *B60B 35/003* (2013.01); *B60B 35/16* (2013.01);
(Continued)

(58) Field of Classification Search
CPC . B62D 7/08; B62D 7/16; B62D 7/163; B62D 7/18; B62D 49/00; B60B 35/003;
(Continued)

(56) References Cited

U.S. PATENT DOCUMENTS 3,768,585 A * 10/1973 Matteo ..................... B62D 7/00
180/434
3,783,966 A * 1/1974 Campbell .............. B60K 17/30
180/433

(Continued)

FOREIGN PATENT DOCUMENTS

CN 202669391 1/2013
CN 202669391 U 1/2013

(Continued)

OTHER PUBLICATIONS

Chinese Office Action issued in Chinese Patent Application No. 2017104429397 dated Dec. 19, 2018.

(Continued)

*Primary Examiner* — Jacob D Knutson
*Assistant Examiner* — Maurice L Williams
(74) *Attorney, Agent, or Firm* — Greenblum & Bernstein, P.L.C.

(57) ABSTRACT

Work vehicle axle device includes a wheel drive case utilizing a centrally disposed vertically extending first coupling portion, a centrally disposed vertically extending second coupling portion spaced from the first coupling portion and an input shaft located below an upper end of either the first or second coupling portions and being configured to transmit rotational power to wheels. The first and second coupling portions are configured to pivotally mount to the wheel drive case to a vehicle body of the work vehicle in a manner that allows the wheel drive case to pivot about an axis that, when viewed from above, is at least one of parallel to a front to back direction of the vehicle body and parallel to a centrally disposed front to back axis of the vehicle body.

16 Claims, 4 Drawing Sheets

(51) Int. Cl.
*B62D 7/18* (2006.01)
*B62D 49/00* (2006.01)
*B60G 9/02* (2006.01)
*B60B 35/16* (2006.01)
*B60B 35/00* (2006.01)
*A01B 69/00* (2006.01)
*B60K 17/22* (2006.01)

(52) U.S. Cl.
CPC ............ *B60G 9/02* (2013.01); *B60K 17/22* (2013.01); *B62D 7/163* (2013.01); *B62D 7/18* (2013.01); *B60G 2200/322* (2013.01); *B60G 2200/422* (2013.01); *B60G 2200/44* (2013.01); *B60G 2206/31* (2013.01); *B60G 2206/32* (2013.01); *B60G 2206/8101* (2013.01); *B62D 7/16* (2013.01); *B62D 49/00* (2013.01)

(58) Field of Classification Search
CPC .... B60B 35/16; B60G 9/02; B60G 2200/322; A01B 69/007
See application file for complete search history.

(56) References Cited

U.S. PATENT DOCUMENTS

| | | | | |
|---|---|---|---|---|
| 3,929,346 A * | 12/1975 | Keene | ............... | B60B 35/003 280/137.5 |
| 4,018,296 A * | 4/1977 | Knudson | ............... | B60G 9/02 180/41 |
| 4,082,377 A * | 4/1978 | Saunders | ............... | B60G 7/005 301/124.1 |
| 4,340,235 A * | 7/1982 | Thompson | ............... | B60G 9/02 180/290 |
| 4,550,926 A * | 11/1985 | MacIsaac | ............... | B60G 3/18 280/124.103 |
| 4,592,440 A * | 6/1986 | Ujita | ............... | B62D 5/06 180/435 |
| 5,046,577 A * | 9/1991 | Hurlburt | ............... | B60G 9/02 180/266 |
| 5,121,808 A * | 6/1992 | Visentini | ............... | B60B 35/003 180/435 |
| 5,308,095 A * | 5/1994 | Fabris | ............... | B60B 35/003 180/6.38 |
| 6,056,081 A * | 5/2000 | Hatlen | ............... | B60K 17/30 180/346 |
| 6,217,047 B1 * | 4/2001 | Heyring | ............... | B60G 9/02 280/124.106 |
| 6,267,198 B1 * | 7/2001 | Hurlburt | ............... | B62D 7/18 180/414 |
| 6,325,396 B1 * | 12/2001 | Romig | ............... | B60G 9/02 280/103 |
| 6,398,242 B1 * | 6/2002 | Niwa | ............... | B60G 9/02 280/124.11 |
| 6,675,925 B2 * | 1/2004 | Takahashi | ............... | B60K 17/303 180/266 |
| RE39,477 E * | 1/2007 | Nellers | ............... | B60G 9/02 280/124.112 |
| 7,513,516 B2 * | 4/2009 | Ryan | ............... | B60G 15/067 248/183.3 |
| 8,398,179 B2 * | 3/2013 | MacKin | ............... | A01D 41/12 180/209 |
| 9,156,312 B1 * | 10/2015 | Ruggeri | ............... | B60B 35/16 |
| 2002/0155917 A1 * | 10/2002 | Nagata | ............... | B60G 9/02 475/220 |
| 2004/0113383 A1 * | 6/2004 | Anderson | ............... | B60G 9/02 280/124.111 |
| 2004/0130114 A1 * | 7/2004 | Weichholdt | ............... | B60G 9/02 280/86.751 |
| 2004/0173979 A1 * | 9/2004 | Ichimura | ............... | B60G 9/02 280/6.154 |
| 2004/0217571 A1 * | 11/2004 | Miyake | ............... | B60G 9/02 280/124.111 |
| 2005/0091823 A1 * | 5/2005 | Stuart | ............... | B60B 35/16 29/434 |
| 2005/0121249 A1 * | 6/2005 | Iwaki | ............... | B60K 17/043 180/252 |
| 2005/0189730 A1 * | 9/2005 | White | ............... | B60G 9/02 280/6.154 |
| 2006/0220335 A1 * | 10/2006 | Damm | ............... | B60G 7/006 280/86.757 |
| 2010/0237578 A1 * | 9/2010 | Hakoda | ............... | B60G 9/02 280/124.116 |
| 2012/0298431 A1 * | 11/2012 | Husson | ............... | B60G 9/02 180/14.4 |
| 2013/0333959 A1 * | 12/2013 | Wagemann | ............... | B60K 7/0007 180/62 |
| 2014/0145409 A1 * | 5/2014 | Wada | ............... | B60B 35/02 280/124.1 |
| 2015/0174958 A1 * | 6/2015 | Riley | ............... | B60B 35/003 301/137 |
| 2018/0050729 A1 * | 2/2018 | Aoyama | ............... | B60Q 1/18 |

FOREIGN PATENT DOCUMENTS

| | | |
|---|---|---|
| CN | 203844606 | 9/2014 |
| CN | 203844606 U | 9/2014 |
| JP | 60-24671 | 2/1985 |
| JP | 2001-086803 | 4/2001 |
| JP | 2002-137753 | 5/2002 |

OTHER PUBLICATIONS

Notice of Reasons for Refusal in Japanese Application No. 2016-126518, drafted Jun. 26, 2019 (Machine Translation in English only).

\* cited by examiner

WORK VEHICLE AXLE DEVICE

CROSS-REFERENCE TO RELATED APPLICATIONS

The present application claims priority under 35 U.S.C. § 119 of Japanese Application No. 2016-126518, filed on Jun. 27, 2016, the disclosure of which is expressly incorporated by reference herein in its entirety.

BACKGROUND OF THE INVENTION

1. Field of the Invention

The present invention relates to an axle device that improves stability of a work vehicle on inclined surfaces and/or reduces the risk of tipping or roll-over, and, when implemented in a farm tractor, can reduce the risk of tractor roll-over.

2. Description of Related Art

The axle device described above mounts left and right wheels to the tractor vehicle body so as to be steerable and drivable, and also so as to enable rolling. An example of an axle device of this kind is provided in Japanese Patent Laid-open Publication No. 2001-086803, for example. The axle device disclosed in Japanese Patent Laid-open Publication No. 2001-086803 includes a base end drive case (wheel drive case) and a wheel support body (wheel support). A coupling shaft (coupling portion) and an input shaft are provided at a middle portion of the base end drive case.

When the conventional technology is adopted, the wheel drive case is coupled to a vehicle body in a state where an axis center of the input shaft is identical to a rolling axis center, and therefore a mounting height of the wheel drive case to the vehicle body is likely to be higher and a space between the wheel drive case and the vehicle body is likely to be narrower. In other words, a rise/fall range of the wheels is likely to be narrow. Also, a dual structure utilizing the coupling portion and a boss portion supporting the input shaft may be required, for example, and manufacture of the wheel drive case is likely to be difficult.

Also, there is demand to provide a steering cylinder and to be able to steer a vehicle body by a minor operation of simply performing start-up of the steering cylinder.

SUMMARY OF THE INVENTION

The present invention provides an axle device that mounts left and right wheels to a tractor vehicle body so as to be steerable and drivable, and also so as to enable rolling, the axle device facilitating enlargement of a rise/fall range of the wheels and enabling advantageous inspection and assembly of a steering cylinder.

An axle device according to the present invention includes a wheel drive case, a pair of left and right wheel supports, and a steering cylinder. The wheel drive case includes a coupling portion provided at a center portion in a lateral direction of a vehicle body, the coupling portion coupled to a tractor vehicle body so as to enable relative rotation around a rolling axis center, which is oriented in a front/back direction of the vehicle body, as a center of rotation, the wheel drive case further having, provided to one of a front portion and a rear portion at the center portion, an input shaft to which rotational drive power is transmitted from the tractor vehicle body and which is oriented in the front/back direction of the vehicle body. The pair of left and right wheel supports are separately supported at each lateral end portion of the wheel drive case so as to enable steering and pivoting, the wheel supports drivably supporting wheels. The steering cylinder is arranged at an exterior portion of the wheel drive case and steers the pair of left and right wheel supports. The coupling portion is provided upright, rising from the front portion and the rear portion to a location above the input shaft. The steering cylinder is arranged at a location within a vertical width of the center portion, below the coupling portion projecting from one of the rear portion and the front portion to which the input shaft is not provided, and is supported by the wheel drive case.

According to the present invention, the rolling axis center is positioned above the input shaft, and therefore a vertical center of the wheel drive case can be positioned lower than the rolling axis center. The rolling axis center and the input shaft are distributed in the vertical direction, and therefore there is no need for a dual structure utilizing a coupling portion and a boss portion of the input shaft.

According to this configuration, the steering cylinder is positioned at an exterior portion of the wheel drive case, and therefore inspection or the like of the steering cylinder can be performed while the steering cylinder remains supported by the wheel drive case. The steering cylinder is supported on the wheel drive case at a location within the vertical width of the center portion of the wheel drive case, below the coupling portion, and therefore the steering cylinder can be brought closer to the wheel drive case and supported in the vertical direction as well as a front/back direction of the wheel drive case, and the steering cylinder and wheel drive case can be assembled with the vehicle body in a single operation.

Accordingly, in an axle device having left and right wheels mounted to the tractor vehicle body so as to be steerable and drivable, and also so as to enable rolling, the lower the vertical center of the wheel drive case is positioned relative to the rolling axis center, the more readily the space between the wheel drive case and the vehicle body can be enlarged, and the more readily the rise/fall range of the wheels can be enlarged. The wheels can be steered by the steering cylinder, and therefore the wheels can be steered with a minor operation of simply starting up the steering cylinder. In this way, easy steering of the vehicle body is enabled, and inspection or the like of the steering cylinder can also be readily performed while the steering cylinder remains supported by the wheel drive case. Furthermore, in a state where the steering cylinder is brought close to the wheel drive case, the steering cylinder can be compactly assembled onto the vehicle body, and can be readily assembled together with the wheel drive case in a single operation.

A further preferred embodiment of the present invention is provided with the following configuration. The wheel drive case includes a drive case main body supporting the left and right wheel supports; and a lidded case portion formed with a boss portion supporting the input shaft, the lidded case portion being capable of attaching to and detaching from the drive case main body. The coupling portion which rises from the one of the front portion and the rear portion to which the input shaft is provided is formed so as to be integral with the lidded case portion.

According to this configuration, the coupling portion on the input shaft side and the lidded case portion provided with the boss portion of the input shaft are formed so as to be integral, and thereby a strength design of the boss portion can be freely modified. Moreover, because the lidded case portion is fixed or connected to the drive case, a number and size of a fixing pin, bolt, or the like can be readily adjusted.

A further preferred embodiment of the present invention is provided with the following configuration. The coupling portion which rises from the one of the front portion and the rear portion to which the input shaft is not provided is formed so as to be integral with the drive case main body.

According to this configuration, the coupling portion on the opposite side from the input shaft side and the drive case main body are formed in a single operation, and thereby a degree of strength can be readily ensured and the coupling portion can be readily positioned on the vehicle body.

A further preferred embodiment of the present invention is provided with the following configuration. A support member supporting the steering cylinder is formed so as to be integral with the wheel drive case.

According to this configuration, the support member of the steering cylinder and the wheel drive case can be formed in a single operation. Therefore, as compared to a case where the members are formed separately and are coupled by a coupler such as a coupling bolt, a coupling seat or the like can be omitted and a projection length of the support member from the wheel drive case can be shortened, and the steering cylinder can be supported closer to the wheel drive case.

A further preferred embodiment of the present invention is provided with the following configuration. The wheel support includes a wheel drive portion drivably supporting the wheel, and a steering support steerably and pivotably supported on the wheel drive case and supporting the wheel drive portion so as to enable relative rotation. A steering portion of the wheel support is integrally formed with the steering support in a state where the steering portion projects from the steering support toward a side where the steering cylinder is positioned. An interlocking rod reciprocally coupling the steering cylinder and the steering portion is positioned within the vertical width of the wheel drive case.

According to this configuration, the steering support and the steering portion can be formed in a single operation. Therefore, as compared to a case where the members are formed separately and are coupled by a coupler such as a coupling bolt, a coupling seat or the like can be omitted and a projection length of the steering portion from the steering support can be shortened, and the interlocking rod can be supported closer to the steering support. The interlocking rod is positioned within the vertical width of the wheel drive case. Therefore, the interlocking rod can be supported on the steering portion in a state not protruding in the vertical direction from the wheel drive case.

A further preferred embodiment of the present invention is provided with the following configuration. In a view along an axle center of the wheel support, the axle center is positioned between the coupling portion rising from the front portion and the coupling portion rising from the rear portion and closer toward the coupling portion rising on the one of the front portion and the rear portion where the input shaft is provided.

According to this configuration, a ground-contact load from the wheels on the input shaft-side coupling portion is larger than the ground-contact load on the coupling portion on the opposite side from the input shaft side. Therefore, the coupling portion on the input shaft side is readily supported by the support on the vehicle body side so as to be unlikely to rattle.

A further preferred embodiment of the present invention is provided with the following configuration. The wheels are front wheels, and the input shaft is provided to the rear portion.

According to this configuration, in the axle device that mounts left and right front wheels to the tractor vehicle body so as to be steerable and drivable, and also so as to enable rolling, the axle device facilitates enlarging the rise/fall range of the front wheels. The front wheels can be steered by the steering cylinder, and the vehicle body can be steered with a minor operation. Inspection or the like of the steering cylinder can also be readily performed while the steering cylinder remains supported by the wheel drive case. Furthermore, in a state where the steering cylinder is brought close to the wheel drive case, the steering cylinder can be compactly assembled onto the vehicle body, and can be assembled together with the wheel drive case in a single operation.

According to another embodiment of the invention, there is provided a work vehicle axle device comprising a wheel drive case comprising a centrally disposed vertically extending first coupling portion, a centrally disposed vertically extending second coupling portion spaced from the first coupling portion and an input shaft located below an upper end of either the first or second coupling portions and being configured to transmit rotational power to wheels. The first and second coupling portions are configured to pivotally mount to the wheel drive case to a vehicle body of the work vehicle in a manner that allows the wheel drive case to pivot about an axis that, when viewed from above, is at least one of parallel to a front to back direction of the vehicle body and parallel to a centrally disposed front to back axis of the vehicle body. The input shaft rotates about an axis that, when viewed from above, is at least one of parallel to a front to back direction of the vehicle body and parallel to a centrally disposed front to back axis of the vehicle body. A steerable left wheel support is arranged on a left outer end of the wheel drive case and being configured to receive a work vehicle wheel. A steerable right wheel support is arranged on a right outer end of the wheel drive case and being configured to receive a work vehicle wheel. A steering cylinder is arranged outside of the wheel drive case and being mounted to or supported by the wheel drive case at a vertical position. The vertical position is between at least one of the upper end of the first coupling portion and a lower end of the wheel drive case, the upper end of the second coupling portion and a lower end of the wheel drive case, the upper end of the first coupling portion and a center axis of the input shaft and the upper end of the second coupling portion and a center axis of the input shaft.

In embodiments, the work vehicle is one of a tractor and a four-wheel drive tractor.

In embodiments, the wheel drive case is a front wheel drive case.

In embodiments, the wheel drive case is a cast member having a removable cover located on a side the front wheel drive case having the input shaft.

In embodiments, the input shaft is oriented toward a rear of the work vehicle.

In embodiments, the steering cylinder is arranged on a front side of the wheel drive case.

In embodiments, the input shaft is oriented toward a rear of the work vehicle.

In embodiments, the wheel drive case comprises a removable cover located on a side the front wheel drive case having the input shaft.

In embodiments, at least one of the first and second coupling portions are integrally formed with the wheel drive case.

In embodiments, the second coupling portion is integrally formed with the wheel drive case and the input shaft is rear-facing.

In embodiments, the first coupling portion is integrally formed with the wheel drive case and the input shaft is rear-facing.

In embodiments, the steering cylinder is mounted to the wheel drive case via at least one support member.

In embodiments, the at least one support member is removable.

In embodiments, the steerable left wheel support comprises a rotatable left wheel drive portion configured to be driven by the input shaft, a pivotally mounted left steering support and a projection connectable to a left side of the steering cylinder.

In embodiments, the steerable right wheel support comprises a rotatable right wheel drive portion configured to be driven by the input shaft, a pivotally mounted right steering support and a projection connectable to a right side of the steering cylinder.

In embodiments, an axis of the steerable left and right wheel supports, when viewed from above, is at least one of located between the first and second coupling portions, located closer to the first coupling portion and located closer to the first or second coupling portion arranged furthest from a free end the input shaft.

In embodiments, the work vehicle wheels are front wheels and the input shaft is rear-facing.

In embodiments, there is provided a work vehicle axle device comprising a wheel drive case comprising at least one centrally disposed vertically extending coupling portion and an input shaft located below an upper end of the at least one coupling portion and being configured to transmit rotational power to wheels. The at least one coupling portion has a mounting opening configured to pivotally mount to the wheel drive case to a vehicle body of the work vehicle in a manner that allows the wheel drive case to pivot about an axis of the mounting opening that, when viewed from above, is at least one of parallel to a front to back direction of the vehicle body and parallel to a centrally disposed front to back axis of the vehicle body. A steerable left wheel support is arranged on a left outer end of the wheel drive case and is configured to receive a work vehicle wheel. A steerable right wheel support is arranged on a right outer end of the wheel drive case and is configured to receive a work vehicle wheel. A steering cylinder is arranged outside of the wheel drive case and is mounted to the wheel drive case on side opposite to that of the input shaft. The steering cylinder has a center axis located at a vertical position that is between at least one of the upper end of the at least one coupling portion and a lower end of the wheel drive case, a lower end of the at least one coupling portion and a lower end of the wheel drive case, the upper end of the at least one coupling portion and a center axis of the input shaft and the lower end of the at least one coupling portion and a center axis of the input shaft.

In embodiments, there is provided a four-wheel drive work vehicle having improved stability on inclined surfaces, comprising an engine, a transmission and a front wheel drive case comprising a centrally disposed vertically extending front coupling portion, a centrally disposed vertically extending rear coupling portion spaced from the front coupling portion and a rear-facing input shaft located below an upper end of either the front or rear coupling portions and being configured to transmit rotational power to front wheels. The front and rear coupling portions are configured to pivotally mount to the front wheel drive case to a vehicle body of the work vehicle in a manner that allows the front wheel drive case to pivot about a main front to back vehicle axis. A steerable left wheel support is mounted to a left outer end of the front wheel drive case via a king pin and is configured to receive a work vehicle wheel. A steerable right wheel support is mounted to a right outer end of the front wheel drive case via a king pin and is configured to receive a work vehicle wheel. A steering cylinder mounted to a front outer side of the front wheel drive case.

In embodiments, the steering cylinder has a center axis located at a vertical position that is between at least one of the upper end of the front coupling portion and a lower end of the front wheel drive case, the upper end of the rear coupling portion and a lower end of the front wheel drive case, the upper end of the front coupling portion and a center axis of the input shaft and the upper end of the rear coupling portion and a center axis of the input shaft.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
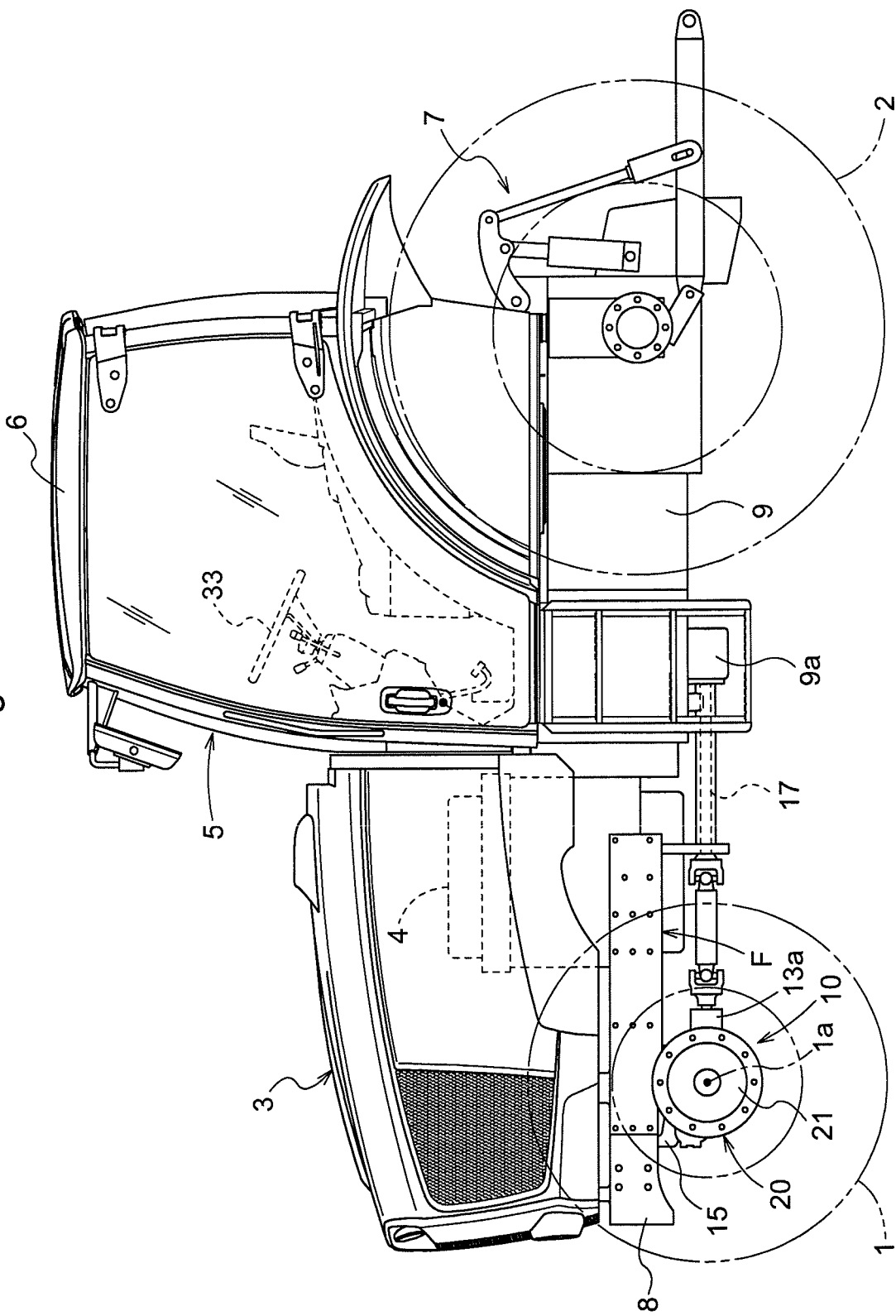
FIG. 1 is an overall left side view of an exemplary tractor.

An embodiment of the present invention is described below with reference to the drawings. FIG. 1 shows an overall left side view of a tractor type work vehicle. As shown in FIG. 1, the tractor includes a pair of left and right front wheels 1 that are steerably and drivably mounted at a front of a vehicle body. A pair of left and right rear wheels 2 are drivably mounted at a rear portion of the vehicle body. Thus, in this example, the tractor is a four-wheel drive tractor. A motor system 3 is located in the front portion of the vehicle body. The motor system 3 includes an engine 4 (e.g., diesel engine) outputting drive power for the front wheels 1 and rear wheels 2. A cockpit 5 is utilize and is located toward the rear portion of the vehicle body. A cabin 6 can also be used to cover a riding space of the cockpit 5. A link mechanism or 3-point hitch 7 can extend rearward from the rear portion of the vehicle body so as to be capable of pivoting vertically.

The tractor may be any of many types of riding-type work vehicles and can be configured to allow coupling thereto of various work apparatuses to the rear portion of the vehicle body such that a work apparatus that is capable of being lifted and lowered. For example, the tractor may include a tiller apparatus, e.g., a rotary tilling device (not shown in the drawings) that is mounted to a rear portion of the vehicle body via the link mechanism 7 such that the rotary tilling device is capable of being lifted and lowered.

As shown in FIG. 1, a vehicle body frame F is utilized on the tractor along with the engine 4. A front frame 8 extends from the engine 4 toward the front of the vehicle body, and a transmission case 9 can be coupled to a front portion to a rear portion of the engine 4. A traveling transmission (not shown in the drawings) can be housed in the transmission case 9, with the traveling transmission transmitting drive power from the engine 4 to the front wheels 1 and the rear wheels 2. The left and right front wheels 1 are supported on the front frame 8 via an axle device 10.

Figure 2:
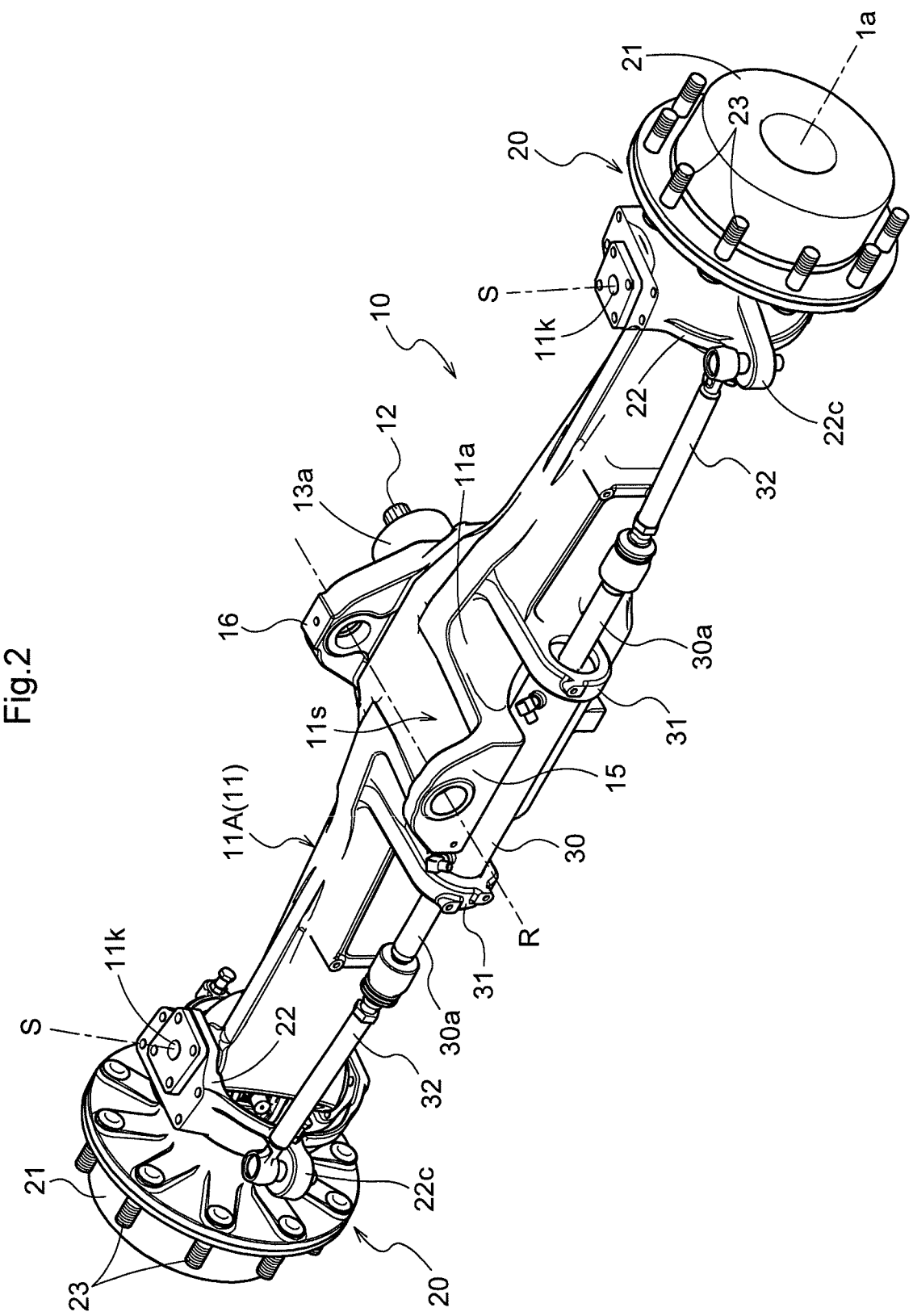
FIG. 2 is a perspective view illustrating an axle device.
Figure 3:
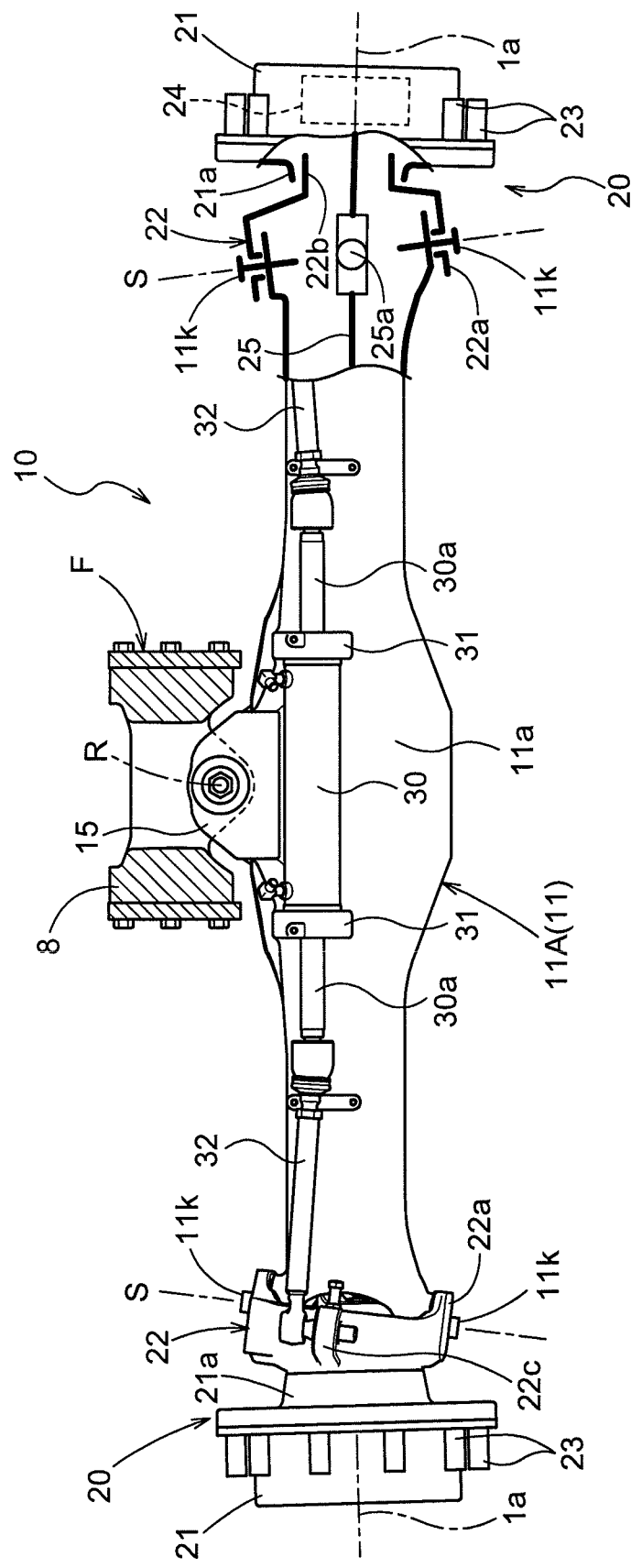
FIG. 3 is a front view illustrating an axle device.

As shown in FIGS. 2 and 3, the axle device 10 includes a wheel drive case 11 supported at a center portion 11a on the front frame 8. A pair of left and right wheel supports 20 are separately supported at each lateral end portion of the wheel drive case 11 and these supports 20 support the front wheels 1.

Figure 4:
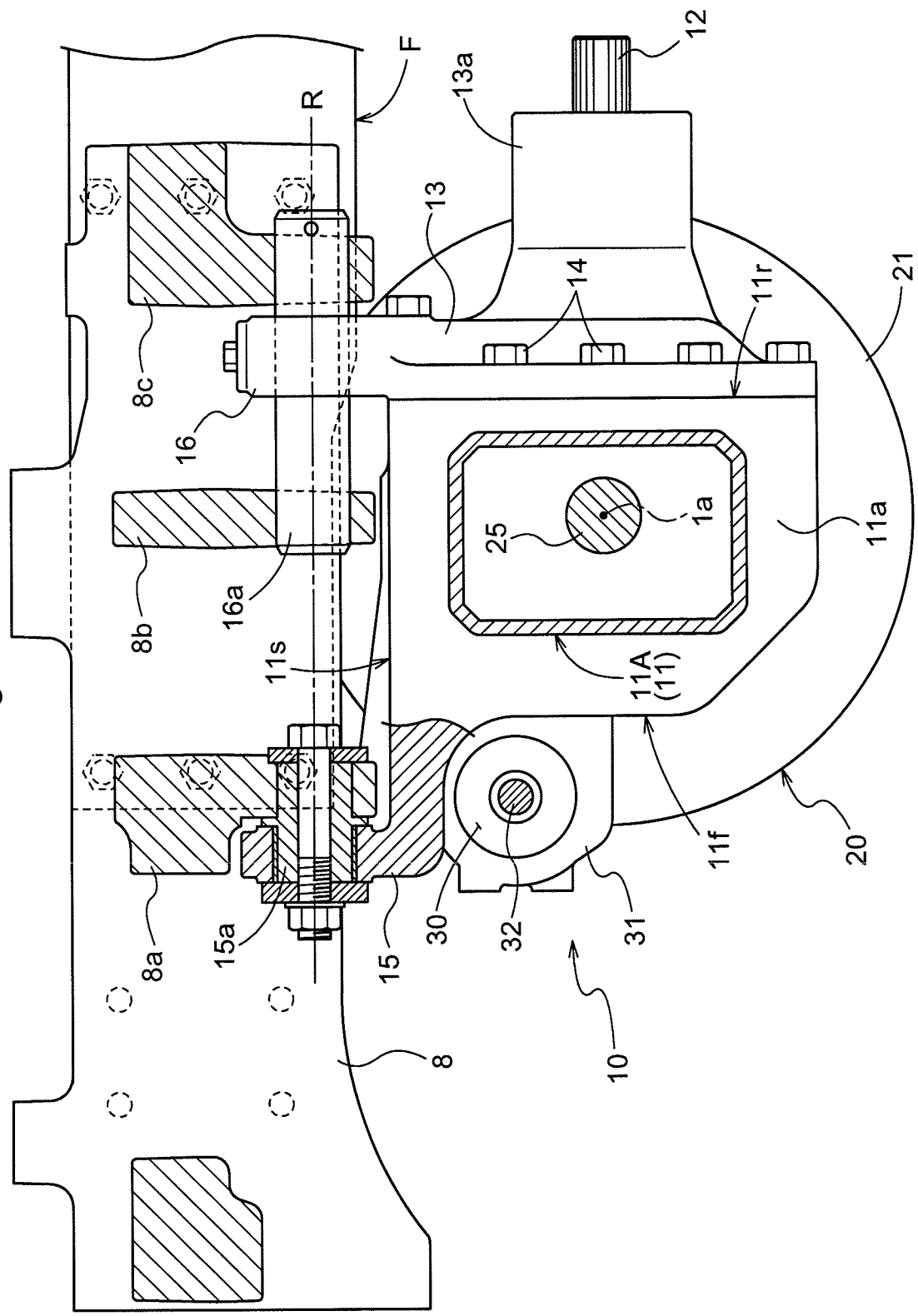
FIG. 4 is a left side view illustrating a support structure of a wheel drive case.

As shown in FIGS. 2 to 4, an input shaft 12 is located at a rear vertical wall 11r (corresponding to a rear portion) of the center portion 11a of the case 11. The input shaft 12 is oriented in a front/back direction of the vehicle body and projects rearward or is rear-facing. A boss portion 13a of the case 11 supports the input shaft 12 and can be integrally formed with a lid, cover portion or cover 13. The cover 13 can be a separate member from a drive case main body 11A of the wheel drive case 11. The cover 13 can be removed and reinstalled on the drive case main body 11A to allow for assembly, inspection, and the like of a front wheel differential mechanism (not shown in the drawings). The cover 13 can be attached to and detached from the drive case main body 11A via coupling bolts 14.

As shown in FIG. 1, the tractor uses a rotation shaft 17 coupled to an output shaft (not shown in the drawings) of a front wheel output portion 9a formed on a lower portion of the transmission case 9. The shaft 17 is coupled to the input shaft 12 and inputs front wheel drive power to the shaft 12 from the engine 4 and the transmission case 9. The input shaft 12 transmits power to the front wheel differential mechanism (not shown in the drawings) housed in the center portion 11a.

As shown in FIGS. 2 to 4, a coupling portion 15 (hereafter referred to as a front coupling portion or front mounting flange 15) stands upright, or extends or is oriented upward and forward, from a front vertical wall 11f (corresponding to a front portion) of the center portion 11a. A coupling portion 16 (hereafter referred to as a rear coupling portion or rear mounting flange 16) stands upright, or extends or is oriented upward, from the rear vertical wall 11r (corresponding to the rear portion) of the center portion 11a. The front coupling portion 15 and the rear coupling portion 16 extend up to a location further upward than a top surface 11s of the center portion 11a and the input shaft 12. The front coupling portion 15 can be integrally formed on the drive case main body 11A by monobloc casting with the drive case main body 11A. The rear coupling portion 16 can be integrally formed with the cover 13 by monobloc casting with the cover 13.

As shown in FIGS. 3 and 4, the front coupling portion 15 and the rear coupling portion 16 are coupled to the front frame 8 so as to enable relative rotation or pivoting about a rolling axis center R, which is oriented in the front/back direction of the vehicle body, as a center of rotation. Specifically, the front coupling portion 15 is coupled, so as to enable rotation or pivoting, via a coupling shaft 15a to a front-most support portion 8a of three support portions 8a, 8b, and 8c formed in a line on the front frame 8 at intervals in the front/back direction of the vehicle body. The rear coupling portion 16 is coupled, so as to enable rotation or pivoting, via a coupling shaft 16a to the two rearward support portions 8b and 8c of the three support portions 8a, 8b, and 8c. In embodiments, mounting axes or openings of portions 8a, 8b and 8c are coaxially aligned.

As shown in FIGS. 2 and 3, the left and right wheel supports 20 provide support on lateral end portions of the wheel drive case 11, with the wheel supports 20 providing support enabling pivoting and steering around a steering axis center S, with S being the center or axis of steering rotation. Specifically, as shown in FIGS. 2 and 3, the wheel supports 20 include a wheel drive portion 21 that rotates and drivably supports the front wheels 1. A steering support 22 supports the wheel drive portion 21 on the wheel drive case 11 so as to enable steering and pivoting.

As shown in FIGS. 2 and 3, the steering support 22 includes a case-side coupling portion 22a coupled to a king pin 11k so as to enable relative rotation or pivoting. The king pin 11k is arranged on two vertical sides of the lateral end portions of the wheel drive case 11. A cylindrical support end portion 22b is housed and engaged so as to enable relative rotation in a cylindrical end portion 21a of the wheel drive portion 21. While supporting the wheel drive portion 21, so as to enable rotation, the steering support 22 is supported on the wheel drive case 11 so as to enable steering and pivoting around the steering axis center S of the king pin 11k as a pivot point. The steering axis center S is generally oriented in a vertical direction of the vehicle body and can be angled slightly as shown in FIG. 3.

The wheel drive portion 21 supports the front wheel 1 so as to enable integral rotation by having a rim portion of the front wheel 1 fixed or connected by a plurality of coupling bolts 23 to an end portion of the wheel drive portion 21 on an opposite side from the steering support 22. A deceleration mechanism 24 having the form of a planetary gear can be mounted in an interior of the wheel drive portion 21. The wheel drive portion 21 is rotationally driven around an axle center 1a (which functions as a center of rotation), with the wheel drive portion 21 rotating with respect to the wheel drive case 11 and the steering support 22. This rotation occurs via the drive power input to the deceleration mechanism 24 from the input shaft 12 via the front wheel differential mechanism (not shown in the drawings) and the rotation shaft 25 (see FIG. 3). The drive power is decelerated by the deceleration mechanism 24 and rotationally drives the front wheels 1. As shown in FIG. 3, a universal coupling 25a can be used which enables pivoting and steering of the steering support 22 while maintaining drive power via the shaft 25.

In a state where the front wheel 1 is steered for straight-line travel (for example), in a view along the axle center 1a, as shown in FIG. 4, the wheel support 20 is supported by the wheel drive case 11 in a state where the axle center 1a is positioned between the front coupling portion 15 and the rear coupling portion 16, and closer to the rear coupling portion 16 than to the front coupling portion 15. As an example of a load distribution in which a ground-contact load of the front wheels 1 is split between the front coupling portion 15 and the rear coupling portion 16, an arrangement can be utilized where the axle center 1a is positioned toward the rear coupling portion 16 in the present embodiment that manifests a load distribution of approximately 70% of the ground-contact load on the front wheels 1 being applied to the rear coupling portion 16. Though adjustments to thickness of the coupling portions 15, 16 may also be utilized due to the load distribution, the load distribution may also be facilitated by arranging the front coupling 15 forward of the drive case.

As shown in FIGS. 2 to 4, a steering cylinder 30 can be provided at a location on an exterior of the wheel drive case 11 below the front coupling portion 15. The steering cylinder 30 is arranged at a location within a vertical width of the center portion 11a and is supported by a pair of left and right support members 31. The left and right support members 31 are configured to support or mount the steering cylinder 30 by mounting and engaging end portions of a cylinder portion of the steering cylinder 30. The left and right support members 31 can be at least partially integrally formed on the wheel drive case 11 by monobloc casting with the wheel drive case 11. A left end portion of a single cylinder rod 30a and one of the steering portions 22c are coupled by an interlocking rod 32, with the cylinder rod 30a coupled to the steering cylinder 30 and oriented in a lateral direction of the vehicle body. The steering portion 22c projects from the steering support 22 of the left front wheel 1 toward a side where the steering cylinder 30 is positioned. A right end portion of the cylinder rod 30a and the steering portion 22c, which projects from the steering support 22 of the right front wheel 1 toward a side where the steering cylinder 30 is positioned, are coupled by the interlocking rod 32. As shown in FIG. 3, the steering portions 22c of the left and right front wheels 1 can be formed so as to be integral with the steering supports 22 by monobloc casting with the steering supports 22. In a state where the left and right interlocking rods 32 are positioned within the vertical width of the wheel drive case 11, the left and right interlocking rods 32 are provided spanning the cylinder rod 30a and the steering portions 22c.

The wheel drive portion 21 of the left and right wheel supports 20 support the front wheels 1, in embodiments, so as to be incapable of relative rotation is rotatably supported on the wheel drive case 11 via the steering support 22. The front wheel drive power from the traveling transmission is transmitted to the deceleration mechanisms 24 via the rotation shaft 17, the input shaft 12, and the rotation shafts 25 and is decelerated. The wheel drive portions 21 is rotationally driven by the decelerated drive power. Therefore, the left and right front wheels 1 are rotationally driven around the axle center 1a as the center of rotation.

The wheel supports 20 supporting the left and right front wheels 1 are supported on the wheel drive case 11. The front coupling portion 15 and the rear coupling portion 16 are located at the center portion 11a of the wheel drive case 11 are supported on the front frame 8 so as to be capable pivoting around the rolling axle center R as a center of pivoting. The wheel drive case 11 can thus be pivoted vertically with respect to the front frame 8 around the rolling axle center R as the center of pivoting. Therefore, the left and right front wheels 1 are capable of rolling movement with respect to the front frame 8. In a case where a travel surface is inclined to the left or right, or in a case where one of the left and right front wheels 1 enters a depression (e.g., gopher hole) in the travel surface or climbs a protrusion (e.g., small bump) in the travel surface, one of the left and right front wheels 1 can pivot down or up with respect to the vehicle body frame F around the rolling axis center R as the center of pivoting. The other of the left and right front wheels 1 will pivot up or down with respect to the vehicle body frame F around the rolling axis center R as the center of pivoting. This can occur while a posture of the vehicle body remains horizontal or substantially horizontal in the left/right direction. As such, the risk of roll-over is reduced.

The wheel drive portion 21, of the left and right wheel supports 20, can support the front wheels 1 so as to be incapable of relative rotation and is supported on the wheel drive case 11 via the steering support 22 so as to enable steering and pivoting around the steering axis center S as the center of pivoting. The steering cylinder 30 is reciprocally coupled to the steering portion 22c of the left and right steering supports 22. In addition, a steering wheel 33 can be located in the cockpit 5 to control steering, also using a control valve (not shown in the drawings), of the steering cylinder 30. Accordingly, the left and right front wheels 1 can be steered and pivoted by the steering cylinder 30, and the vehicle body can be steered.

Other Embodiments (1) In the non-limiting embodiment described above, an example is given in which the axle device 10 is configured for use with front wheels. However, the input shaft 12 may instead be located on a front portion of the wheel drive case 11 and the axle device 10 may be configured for use with rear wheels.

(2) Also, in the embodiment described above, an example is given which employs a configuration where the axle center 1a is positioned between the front coupling portion 15 and the rear coupling portion 16 and closer to the rear coupling portion 16 than to the front coupling portion 15. However, a configuration may also be employed in which the axle center 1a is positioned at the center or substantially at the center between the front coupling device 15 and the rear coupling device 16. Also, a configuration may be employed in which the axle center 1a is positioned between the front coupling portion 15 and the rear coupling portion 16 and closer to the front coupling portion 15 than to the rear coupling portion 16.

(3) In the embodiment described above, an example is given in which the rear coupling portion 16 is integrally formed on the lidded case portion or cover 13. However, the rear coupling portion 16 and the cover 13 may instead be formed as separate members.

(4) In the embodiment described above, an example is given in which the front coupling portion 15 is integrally formed on the drive case main body 11A. However, a configuration may be employed in which the front coupling portion 15 is formed as a separate member from the drive case main body 11A and is bolt-coupled to the drive case main body 11A.

(5) In the embodiment described above, an example is given in which the steering portion 22c is integrally formed on the steering support 22. However, the steering portion 22c and the steering support 22 may instead be formed as separate members.

(6) In the embodiment described above, an example is given in which the support member 31 is at least partially integrally formed on the wheel drive case 11. However, the support member 31 and the wheel drive case 11 may instead be formed as separate members.

The present invention is not limited to a tractor provided with front and rear wheels, and can also be applied to a tractor provided with a mini crawler instead of rear wheels.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A work vehicle axle device comprising:
   a wheel drive case comprising:
      a drive case main body;
      a centrally disposed vertically extending first coupling portion;
      a centrally disposed vertically extending second coupling portion spaced from the first coupling portion;
      an input shaft located below an upper end of the second coupling portion and being configured to transmit rotational power to wheels; and
      a removable cover portion including a boss portion supporting the input shaft and being attachable to and detachable from the drive case main body;
      the centrally disposed vertically extending second coupling portion being integrally formed with the removable cover portion;
   said first and second coupling portions being configured to pivotally mount to the wheel drive case to a vehicle body of the work vehicle in a manner that allows the wheel drive case to pivot about an axis that, when viewed from above, is at least one of:
      parallel to a front to back direction of the vehicle body; and
      parallel to a centrally disposed front to back axis of the vehicle body;
   said input shaft rotating about an axis that, when viewed from above, is at least one of:
      parallel to a front to back direction of the vehicle body; and
      parallel to a centrally disposed front to back axis of the vehicle body;
   a steerable left wheel support arranged on a left outer end of the wheel drive case and being configured to receive a work vehicle wheel;
   a steerable right wheel support arranged on a right outer end of the wheel drive case and being configured to receive a work vehicle wheel;
   a steering cylinder arranged outside of the wheel drive case being supported by the wheel drive case at a vertical position, located below and overlapped with the first coupling portion when viewed from above, wherein the vertical position is between at least one of:
      the upper end of the first coupling portion and a lower end of the wheel drive case;
      the upper end of the second coupling portion and a lower end of the wheel drive case;
      the upper end of the first coupling portion and a center axis of the input shaft; and
      the upper end of the second coupling portion and a center axis of the input shaft,
   wherein the steering cylinder is arranged on a front side of the wheel drive case.

2. The axle device of claim 1, wherein the work vehicle is one of:
   a tractor; and
   a four-wheel drive tractor.

3. The axle device of claim 1, wherein the wheel drive case is a front wheel drive case.

4. The axle device of claim 1, wherein the input shaft is oriented toward a rear of the work vehicle.

5. The axle device of claim 1, wherein the first coupling portions is integrally formed with the wheel drive case.

6. The axle device of claim 5, wherein the input shaft is rear-facing.

7. The axle device of claim 1, wherein the steering cylinder is mounted to the wheel drive case via at least one support member.

8. The axle device of claim 7, wherein the at least one support member is removable.

9. The axle device of claim 1, wherein the steerable left wheel support comprises:
   a rotatable left wheel drive portion configured to be driven by the input shaft;
   a pivotally mounted left steering support; and
   a projection connectable to a left side of the steering cylinder.

10. The axle device of claim 1, wherein the steerable right wheel support comprises:
   a rotatable right wheel drive portion configured to be driven by the input shaft;
   a pivotally mounted right steering support; and
   a projection connectable to a right side of the steering cylinder.

11. The axle device of claim 1, wherein an axis of the steerable left and right wheel supports, when viewed from above, is at least one of:
   located between the first and second coupling portions;
   located closer to the first coupling portion than to the second coupling portion;
   located closer to the first or second coupling portion arranged furthest from a free end the input shaft.

12. The axle device of claim 1, wherein the work vehicle wheels are front wheels and the input shaft is rear-facing.

13. The work vehicle of claim 1, wherein the centrally disposed vertically extending first coupling portion is coupled via a first coupling shaft to a front frame and the centrally disposed vertically extending second coupling portion is coupled via a second coupling shaft to the front frame so as to enable relative rotation about a rolling axis center being oriented in the front to back direction of the vehicle body.

14. A four-wheel drive work vehicle having improved stability on inclined surfaces, comprising:
   an engine;
   a transmission;
   a front wheel drive case comprising:
      a drive case main body;
      a centrally disposed vertically extending front coupling portion;
      a centrally disposed vertically extending rear coupling portion spaced from the front coupling portion;

a rear-facing input shaft located below an upper end of the rear coupling portions and being configured to transmit rotational power to front wheels; and a removable cover portion including a boss portion supporting the input shaft and being attachable to and detachable from the drive case main body;

the centrally disposed vertically extending rear coupling portion being integrally formed with the removable cover portion;

said front and rear coupling portions being configured to pivotally mount to the front wheel drive case to a vehicle body of the work vehicle in a manner that allows the front wheel drive case to pivot about a main front to back vehicle axis;

a steerable left wheel support mounted to a left outer end of the front wheel drive case via a king pin and being configured to receive a work vehicle wheel;

a steerable right wheel support mounted to a right outer end of the front wheel drive case via a king pin and being configured to receive a work vehicle wheel;

a steering cylinder mounted to a front outer side of the front wheel drive case, located below and overlapped with the front coupling portion when viewed from above.

15. The work vehicle of claim 14, wherein the steering cylinder has a center axis located at a vertical position, wherein the vertical position is between at least one of:

the upper end of the front coupling portion and a lower end of the front wheel drive case;

the upper end of the rear coupling portion and a lower end of the front wheel drive case;

the upper end of the front coupling portion and a center axis of the input shaft; and the upper end of the rear coupling portion and a center axis of the input shaft.

16. The work vehicle of claim 14, wherein the centrally disposed vertically extending first coupling portion is coupled via a first coupling shaft to a front frame and the centrally disposed vertically extending second coupling portion is coupled via a second coupling shaft to the front frame so as to enable relative rotation about a rolling axis center being oriented in the front to back direction of the vehicle body.

* * * * *

UNITED STATES PATENT AND TRADEMARK OFFICE
CERTIFICATE OF CORRECTION

PATENT NO. : 10,703,409 B2
APPLICATION NO. : 15/619954
DATED : July 7, 2020
INVENTOR(S) : T. Umemoto It is certified that error appears in the above-identified patent and that said Letters Patent is hereby corrected as shown below:

Column 12, Line 17 (Claim 5, Line 2) please change "portions is" to -- portion is --
Column 12, Line 47 (Claim 11, Line 8) please change "end the" to -- end of the --
Column 13, Line 2 (Claim 14, Line 12) please change "portions and" to -- portion and --

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*